United States Patent
Shiraishi (10) Patent No.: US 11,046,155 B2
(45) Date of Patent: Jun. 29, 2021

(54) SUN VISOR STRUCTURE

(71) Applicant: KASAI KOGYO CO., LTD., Kanagawa (JP)

(72) Inventor: Tomoya Shiraishi, Kanagawa (JP)

(73) Assignee: KASAI KOGYO CO., LTD., Kanagawa (JP)

(*) Notice: Subject to any disclaimer, the term of this patent is extended or adjusted under 35 U.S.C. 154(b) by 45 days.

(21) Appl. No.: 16/637,839

(22) PCT Filed: Sep. 13, 2017

(86) PCT No.: PCT/JP2017/033064
§ 371 (c)(1),
(2) Date: Feb. 10, 2020

(87) PCT Pub. No.: WO2019/053810
PCT Pub. Date: Mar. 21, 2019

(65) Prior Publication Data
US 2021/0046808 A1    Feb. 18, 2021

(51) Int. Cl.
*B60J 3/02* (2006.01)
*B60R 11/00* (2006.01)

(52) U.S. Cl.
CPC .......... *B60J 3/0278* (2013.01); *B60J 3/0265* (2013.01); *B60R 11/00* (2013.01); *B60R 2011/0035* (2013.01)

(58) Field of Classification Search
CPC .............................. B60J 3/0278; B60J 3/0265
See application file for complete search history.

(56) References Cited

U.S. PATENT DOCUMENTS

| | | | | |
|---|---|---|---|---|
| 5,556,154 A | * | 9/1996 | Vaxelaire | B60J 3/0278 296/97.1 |
| 6,634,696 B1 | * | 10/2003 | Tiesler | B60J 3/0204 296/97.1 |
| 2018/0236850 A1 | * | 8/2018 | Soga | B60J 3/0278 |

FOREIGN PATENT DOCUMENTS

| | | |
|---|---|---|
| JP | H09-216533 A | 8/1997 |
| JP | H10-035275 A | 2/1998 |
| JP | 2003-267049 A | 9/2003 |
| JP | 2006-347210 A | 12/2006 |

OTHER PUBLICATIONS

International Search Report for International Application No. PCT/JP2017/033064 dated Oct. 24, 2017, Japan, 1 page.

* cited by examiner

*Primary Examiner* — Joseph D. Pape
(74) *Attorney, Agent, or Firm* — United IP Counselors, LLC (57) ABSTRACT

A sun visor structure includes a sun visor body made of foamed resin, a support plate that is insert-molded in the sun visor body, and an attachment component supported by the support plate. The attachment component has a first elastic engagement hook and a second elastic engagement hook. The sun visor body has insertion holes for inserting the first elastic engagement hook and the second elastic engagement hook. The support plate has engagement holes to engage the first elastic engagement hook and the second elastic engagement hook. The engagement holes are smaller than the insertion holes and concentric with the insertion holes. The attachment component has a guide pin. The support plate has a positioning hole for inserting the guide pin to position the attachment component.

9 Claims, 7 Drawing Sheets

FIG. 7 ic # SUN VISOR STRUCTURE

CROSS-REFERENCE TO RELATED APPLICATIONS

This application is a National Stage Entry application of PCT International Application No. PCT/JP2017/033064, filed on Sep. 13, 2017, the entire contents of which are hereby incorporated by reference.

BACKGROUND

1. Technical Field

The present invention relates to a sun visor structure.

2. Description of the Background

Conventionally sun visor structures have been known, which include a ticket holder to hold a piece of sheet, such as a ticket (JP 2003-267049 A, hereinafter referred to as "Patent Literature 1").

This conventional sun visor structure includes a ticket holder having a slot to insert a piece of sheet for holding. To support the ticket holder that will receive external force, the sun visor body made of foamed resin has to internally have a base that occupies a relatively large area.

An attachment component, such as a ticket holder, having a base that occupies a large area inside of the sun visor body may interfere with other components, such as a vanity mirror attached inside of the sun visor body. In such a case, the design to place the components is restricted.

BRIEF SUMMARY

In view of the above problem, the present invention provides a sun visor structure capable of supporting an attachment component reliably and having a high degree of freedom for design to place the component.

To achieve the above, a sun visor structure of the present invention has the following configuration.

(1) A sun visor structure of the present invention includes: a sun visor body made of foamed resin; a support plate that is insert-molded in the sun visor body; and an attachment component supported by the support plate. The attachment component has a first elastic engagement hook and a second elastic engagement hook. The sun visor body has insertion holes for inserting the first elastic engagement hook and the second elastic engagement hook. The support plate has engagement holes to engage the first elastic engagement hook and the second elastic engagement hook, the engagement holes being smaller than the insertion holes and being concentric with the insertion holes.

(2) In the configuration of (1), the attachment component has a guide pin, and the support plate has a positioning hole for inserting the guide pin to position the attachment component.

(3) In the configuration of (1) or the support plate has a protrusion at a center part, the protrusion protruding toward the attachment component, and the protrusion has the positioning hole.

(4) In the configuration of any one of (1) to (3), the support plate has a failsafe hole at a position displaced from a line connecting centers of the engagement holes.

(5) In the configuration of any one of (1) to (4), the attachment component is a ticket holder including a base having the elastic engagement hooks, and an elastic tongue that is cantilevered and extends from the base.

(6) In the configuration of (5), each of the elastic engagement hooks has a pair of opposed hooks, and the pair of opposed hooks are opposed in an extending direction of the elastic tongue.

(7) In the configuration of (6), one of the past of opposed hooks that is close to the elastic tongue has an engagement strength larger than the other hook has.

The present n provides a sun visor structure capable of supporting an attachment component reliably and having a high degree of freedom for design to place the component.

DETAILED DESCRIPTION

Embodiments

Referring to the drawings, the following describes embodiments of the present invention in details. The following describes embodiments by way of an example of an attachment component 20 that is a ticket holder 20 to hold a piece of sheet, such as a ticket. The attachment component 20 may be other components, such as a vanity mirror.

Figure 1:
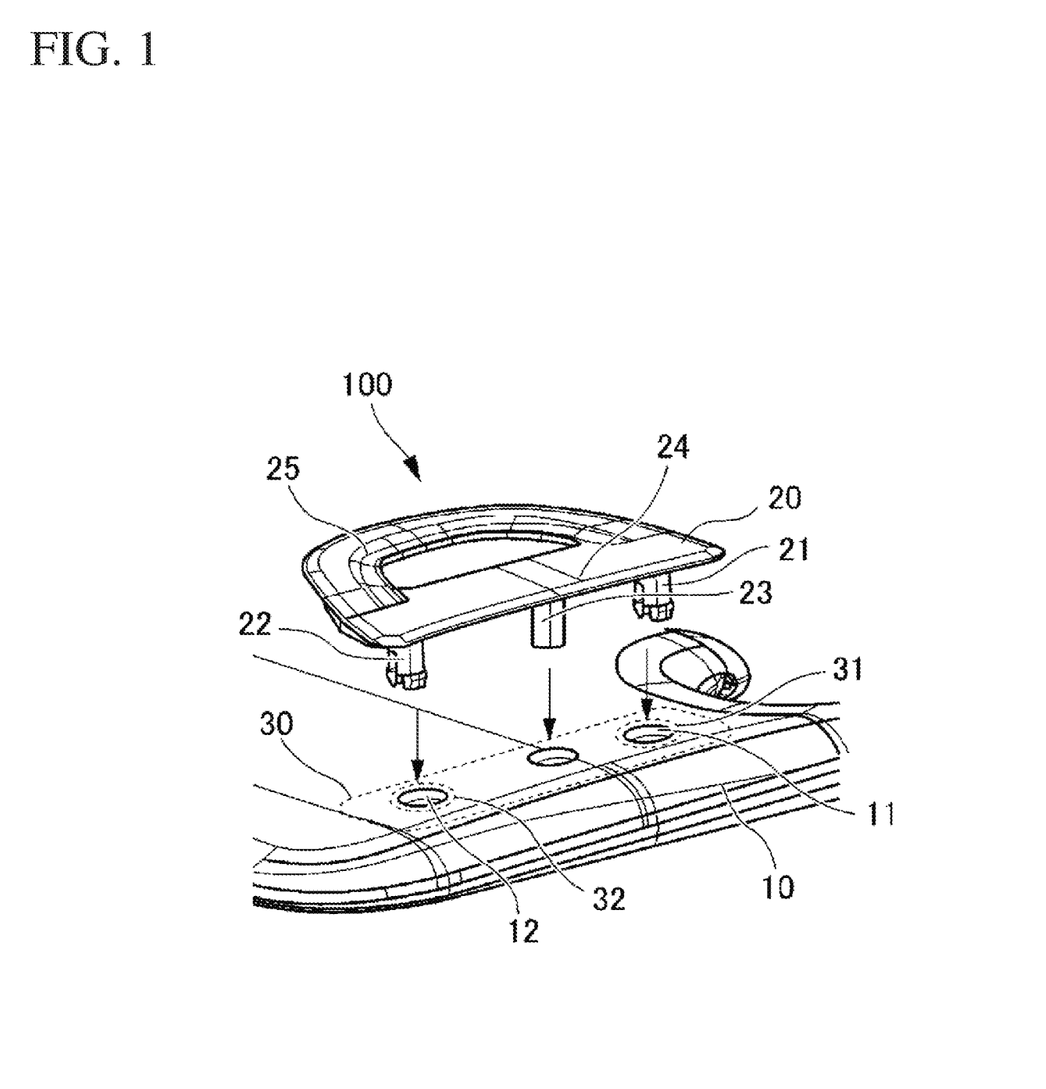
FIG. 1 describes the attaching of a ticket holder to a sun visor body.
Figure 2:
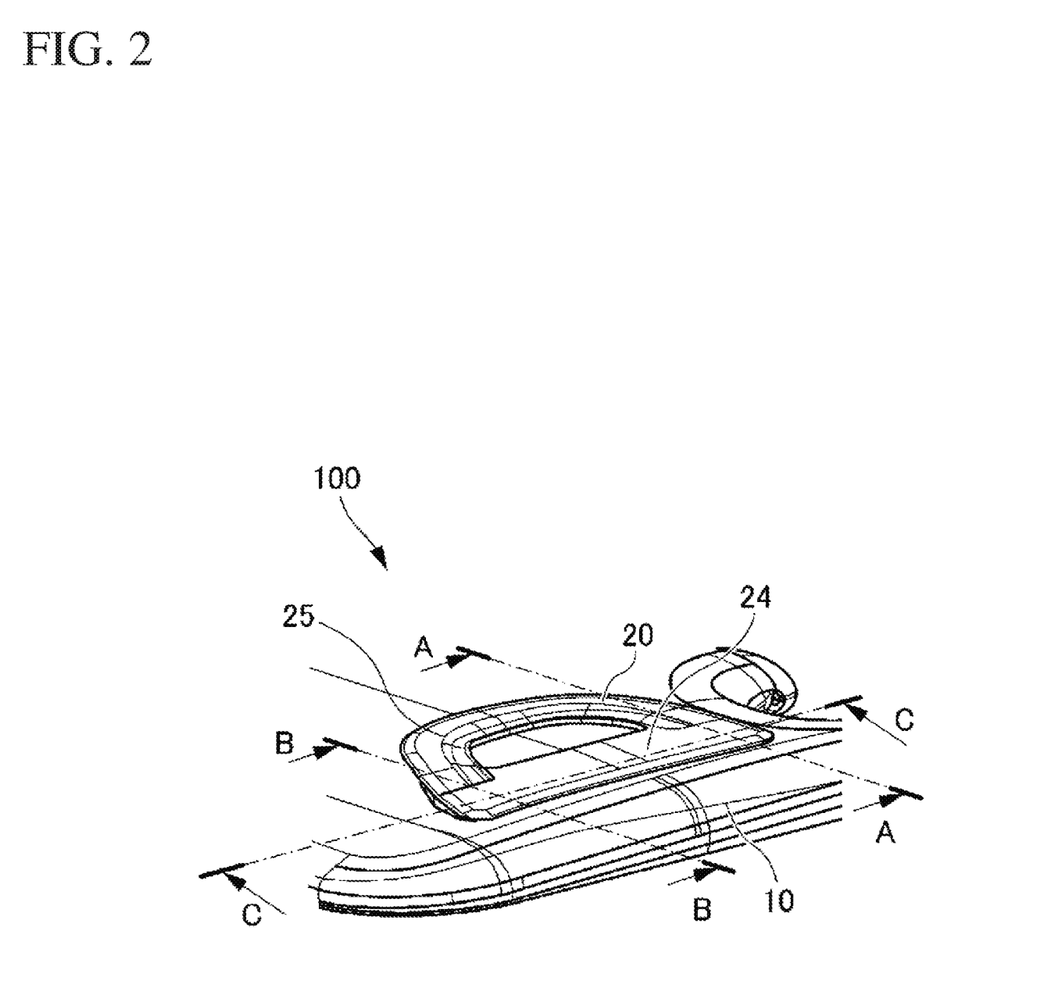
FIG. 2 describes the ticket holder attached to the sun visor body.
Figure 3:
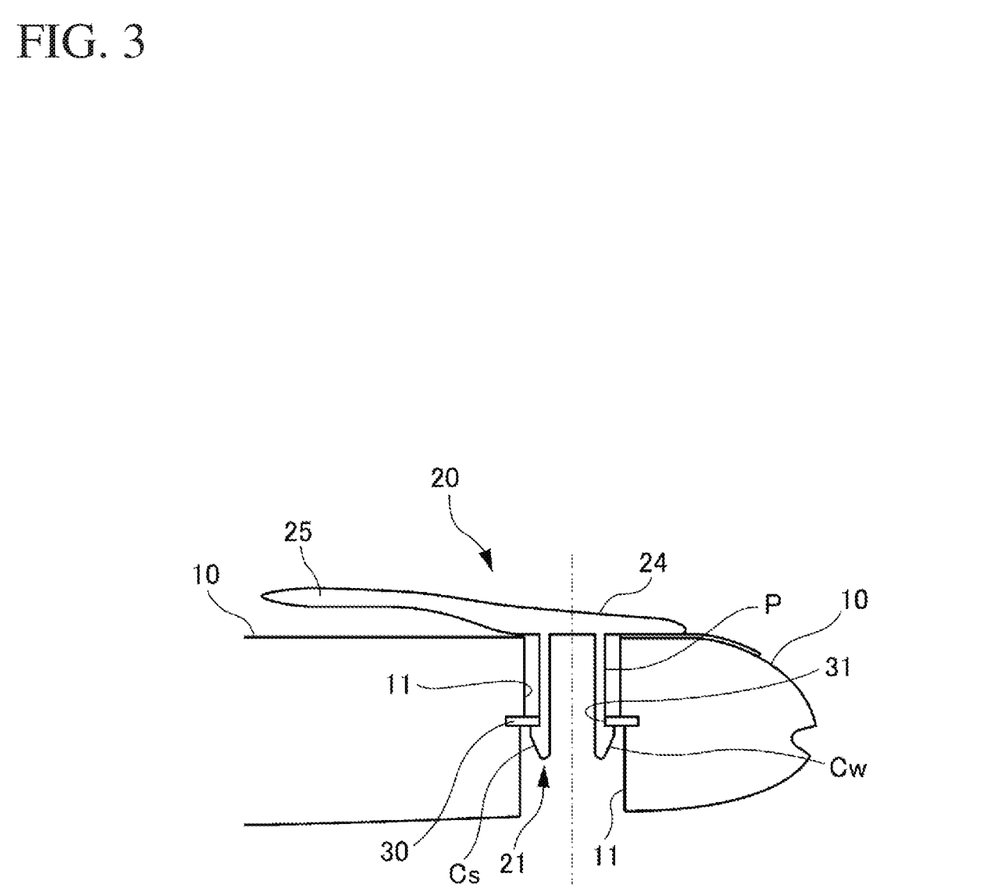
FIG. 3 shows a view taken along the line A-A or B-B of FIG. 2.
Figure 4A:
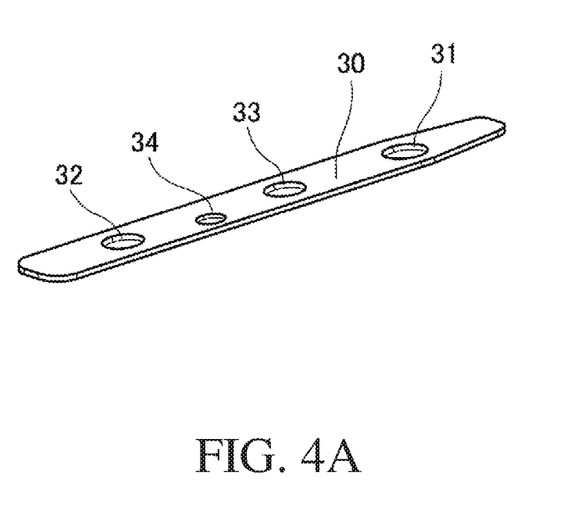
FIG. 4A is a perspective view of a support plate.
Figure 4B:
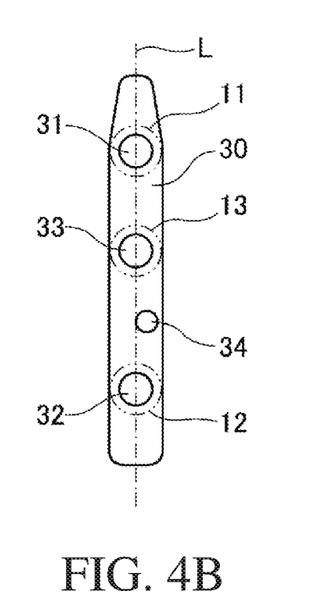
FIG. 4B is a plan view of the support plate.

FIG. 1 is a partial perspective view of a sun visor structure 100, and shows attaching of the ticket holder 20 to a sun visor body 10. FIG. 2 is a partial perspective view of the sun visor structure 100, and shows the ticket holder 20 attached to the sun visor body 10. FIG. 3 is a partial cross-sectional view of the sun visor structure 100 taken along the line A-A in FIG. 2. FIG. 4A is a perspective view of a support plate 30, and FIG. 4B is a plan view of the support plate 30.

Since cross-sectional views taken along the line A-A and the line B-B in FIG. 2 are almost the same, FIG. 3 shows the view taken along the line A-A as a representative example.

The sun visor structure 100 blocks light and generally has a flat sheet form. The sun visor structure 100 typically is disposed rotatably above a front-glass window on the front of a vehicle, and blocks sunlight toward an occupant of the vehicle to keep their vision.

As shown in FIG. 1 and FIG. 2, the sun visor structure 100 includes: the sun visor body 10 made of foamed resin; the support plate 30 insert-molded in the sun visor body 10; and the ticket holder 20 (attachment component) supported by the support plate 30.

The sun visor body 10 has a first insertion hole 11 and a second insertion hole 12 for inserting a first elastic engagement hook 21 and a second elastic engagement hook 22 of the ticket holder 20, respectively.

The sun visor body 10 blocks light and generally has a flat sheet form, and is made by forming foamed resin, such as expanded polypropylene (EPP). The sun visor body 10 may include a core formed with foamed resin and skin covering the surface of the core.

As shown in FIG. 1, the ticket holder 20 has a base 24 and the first elastic engagement hook 21 and the second elastic engagement hook 22 that protrude downward from the lower face of the base 24. In this way, the ticket holder 20 has only two parts to be engaged with the support plate 30 that is insert-molded in the sun visor body 10 for supporting. This configuration with the first elastic engagement hook 21 and the second elastic engagement hook 22 distributes the tensile force and the bending moment due to external force acting on the ticket holder 20 correctly as compared with the configuration having the engagement part(s) only at a single part or at three or more parts. The first elastic engagement hook 21 and the second elastic engagement hook 22 may have the same shape.

The ticket holder 20 has a guide pin 23 at a substantially center part between the first elastic engagement hook 21 and the second elastic engagement hook 22, and the guide pin 23 protrudes downward from the lower face of the base 24. The guide pin 23 generally has a substantially cylindrical shape, and has a tapered part at the lower end that is tapered toward the bottom to guide the guide pin 23 to a positioning hole 33.

The ticket holder 20 also has an elastic tongue 25 that is cantilevered and extends from the base 24.

When the ticket holder 20 is attached to the sun visor body 10, this elastic tongue 25 has a certain gap from the sun visor body 10, almost no gap from the sun visor body 10, or no gap from the sun visor body 10, and is biased toward the sun visor body 10.

Such a ticket holder 20 attached to the sun visor body 10 allows a user to keep a piece of sheet, such as a ticket, between the sun visor body 10 and the elastic tongue 25 for holding.

As shown in FIG. 3, the first elastic engagement hook 21 has a pair of a hook Cs and a hook Cw that are opposed to each other. Each of the hook Cs and the hook Cw has a bulging part that bulges in the mutually separating direction.

The bulging part has a tapered part that is inclined from the bottom to the top, and has a flat upper face opposed to the lower edge face of a first engagement hole 31.

The outer dimension between the upper part of the bulging part of the hook Cs and the upper part of the bulging part of the hook Cw is set larger than the inner dimension of the first engagement hole 31. The outer dimension between the lower part of the bulging part of the hook Cs and the lower part of the bulging part of the hook Cw is set smaller than the inner dimension of the first engagement hole 31. When inserting the first elastic engagement hook 21 into the first engagement hole 31, this configuration guides the first elastic engagement hook 21 into the first engagement hole 31 while elastically deforming the first elastic engagement hook 21 and thoroughly inserts the hook Cs and the hook Cw into the first engagement hole 31 so as to reliably engage the hook Cs and the hook Cw with the first engagement hole 31.

Although not shown clearly in the cross-sectional view of FIG. 3, each of the first elastic engagement hook 21 and the second elastic engagement hook 22 includes a cylindrical part P that connects to the lower face of the base 24 and protrudes downward from the base 24, and has the hook Cs and the hook Cw that are spaced at different positions at the lower end of the cylindrical part P.

The pair of hook Cs and hook Cw are opposed in the extending direction of the elastic tongue 25. When a user takes out a ticket held at the ticket holder 20, force will act on the elastic tongue 25 in the direction of separating the base 24 away from the sun visor body 10. These hook Cs and hook Cw effectively resist such force.

Between the pair of opposed hook Cs and hook Cw, the hook Cs close to the elastic tongue 25 has an engagement strength larger than the other hook Cw has. In one example, the hook Cs has a cross-sectional area and a shape larger than the other hook Cw has. This configuration allows the hook Cs and the hook Cw to more effectively resist the force acting on the elastic tongue 25 in the direction of separating the base 24 away from the sun visor body 10. This configuration also enables a rational and compact structure of the first elastic engagement hook 21 and the second elastic engagement hook 22.

In the present embodiment, the guide pin 23, the first elastic engagement hook 21 and the second elastic engagement hook 22 are aligned on the same line. In another embodiment, these components may not be aligned on a line. This increases the resistance against the rotation of the ticket holder 20 around the base 24, and so increases the rigidity to support the ticket holder 20 at the sun visor body 10.

As shown in FIG. 4A and FIG. 4B, the support plate 30 is an elongated rectangular thin plate, and is made by press-punching of a base material that is an electrogalvanized steel sheet, for example.

As shown in FIG. 4B, the support plate 30 has the first engagement hole 31 and the second engagement hole 32 to lock the first elastic engagement hook 21 and the second elastic engagement hook 22, respectively. The first engagement hole 31 and the second engagement hole 32 are smaller than the first insertion hole 11 and the second insertion hole 12, and are concentric with the first insertion hole 11 and the second insertion hole 12, respectively.

The support plate 30 has the positioning hole 33 at a substantially center part between the first engagement hole 31 and the second engagement hole 32. The positioning hole 33 receives the inserted guide pin 23 to position the ticket holder 20. The inner diameter of the positioning hole 33 is slightly larger than the outer diameter of the guide pin 23. With this configuration, simply inserting the guide pin 23 into the positioning hole 33 enables easy positioning of the ticket holder 20 relative to the sun visor body 10. In the present embodiment, the outer shape of the guide pin 23 and the inner shape of the positioning hole 33 are circle. In another embodiment, they may have a similar polygonal shape, such as quadrangles. This configuration enables the positioning of the ticket holder 20 relative to the sun visor body 10 in the plane, including the orientation of the ticket holder 20.

As shown in FIG. 4B, the support plate 30 has a failsafe hole 34 at a position displaced from the imaginary neutral line L connecting the center of the first engagement hole 31 and the center of the second engagement hole 32. During insert-molding to manufacturing the sun visor structure 100, this configuration allows the operator to simply insert a pin (not shown), which a molding die for the sun visor body 10 has in advance, into the failsafe hole 34, and so allows the operator to correctly place the support plate 30 (correctly about the vertical orientation or about the surface and the rear face) at each of the sun visor body 10 for driver seat and the sun visor body 10 for passenger seat, which have a left/right line-symmetric relationship.

In the support plate 30, the first engagement hole 31 and the second engagement hole 32 may have burrs (not shown) on the lower edge faces, i.e., on the other side of the face for inserting the first elastic engagement hook 21 and the second elastic engagement hook 22. These burrs are generated during the press-punching of the support plate 30. These burrs catch the hooks Cs and the hooks Cw of the first elastic engagement hook 21 and the second elastic engagement hook 22 of the ticket holder 20. This generates resistance and so prevents the detachment of the hook Cs and the hook Cw engaged with the lower edge faces of the first engagement hole 31 and the second engagement hole 32.

Next the following describes a modified example of the support plate 30.

Figure 5:
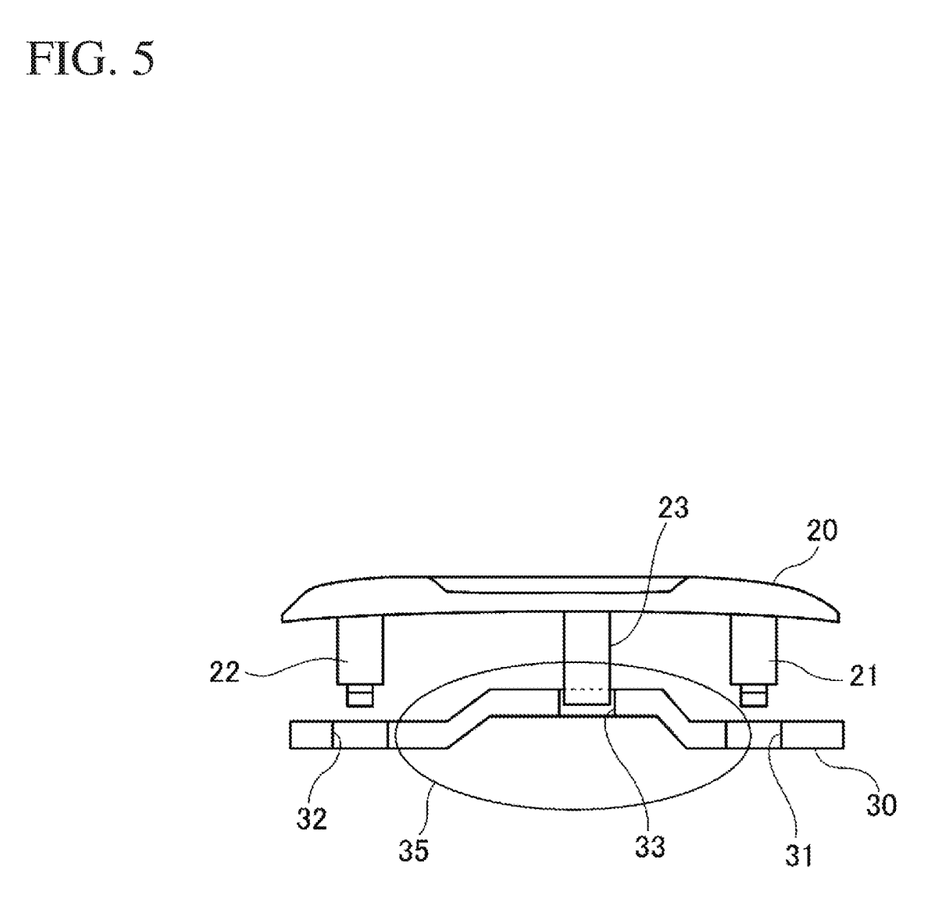
FIG. 5 describes insertion of the ticket holder into a support plate in one modified example.
Figure 6:
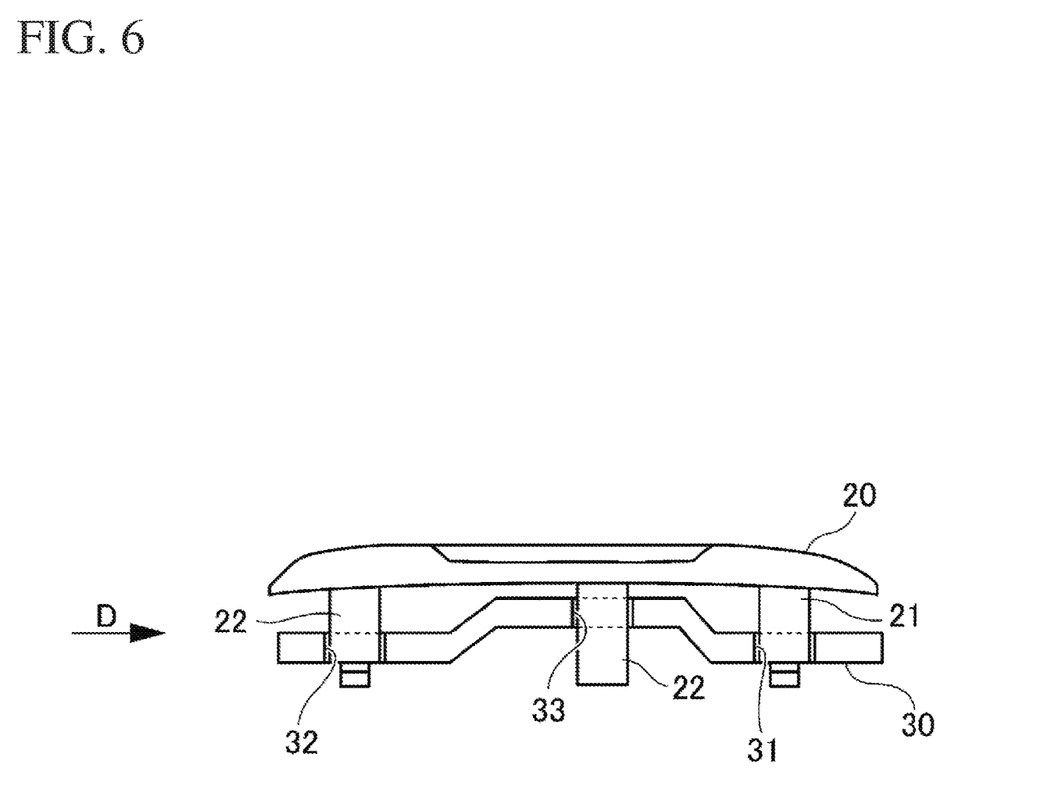
FIG. 6 describes the ticket holder inserted into a support plate for engaging in the modified example.
Figure 7:
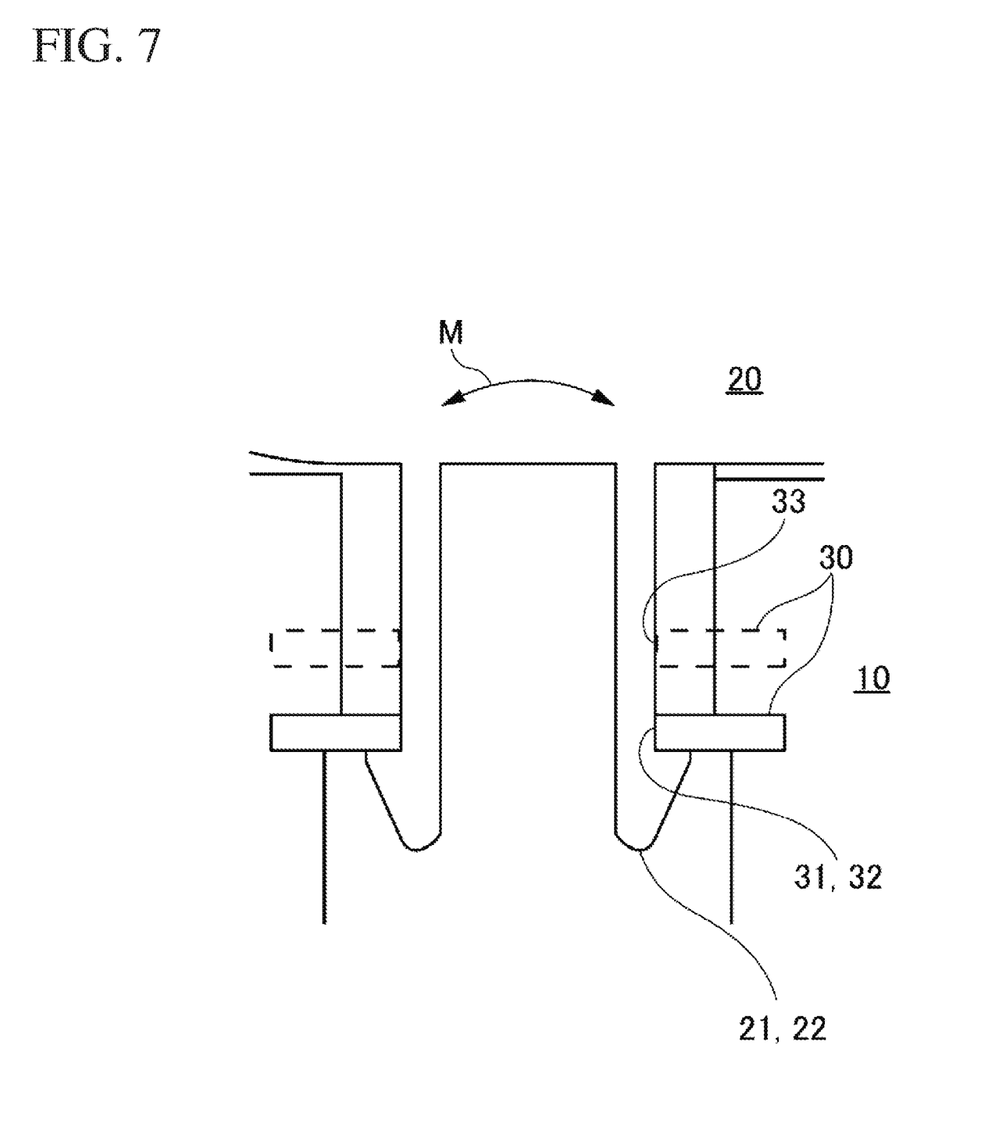
FIG. 7 shows the support plate viewed in the direction of arrow D in FIG. 6.

FIG. 5, FIG. 6, and FIG. 7 show a modified example of the support plate 30.

FIG. 5 describes insertion of the ticket holder 20 into a support plate 30 in one modified example. FIG. 6 corresponds to a view taken along the line C-C of FIG. 2, and shows the ticket holder 20 inserted into the support plate 30 for engaging in the modified example. FIG. 7 shows this support plate viewed in the direction of arrow D in FIG. 6. FIG. 5 and FIG. 6 omit the sun visor body 10.

As shown in FIG. 5 and FIG. 6, the support plate 30 has a protrusion 35 at a center part that protrudes toward the ticket holder 20, and the protrusion 35 has a positioning hole 33.

The support plate 30 has a first engagement hole 31 and a second engagement hole 32 on both sides of the center part.

As shown in FIG. 5, this configuration firstly inserts the guide pin 23 into the positioning hole 33 of the protrusion 35 when the lower ends of the guide pin 23, the first elastic engagement hook 21 and the second elastic engagement hook 22 are on a substantially same plane. This allows the operator to easily insert the first elastic engagement hook 21 and the second elastic engagement hook 22 into the first engagement hole 31 and the second engagement hole 32, respectively.

As shown in FIG. 6 and FIG. 7, the positioning hole 33 is vertically away from the first engagement hole 31 and the second engagement hole 32. This improves the rigidity of the sun visor body 10 to support the support plate 30, especially in the rotating direction M mainly in the longitudinal direction of the support plate 30. This also suppresses wobbling of the ticket holder 20 relative to the sun visor body 10.

In one example, the sun visor structure 100 as stated above is manufactured as follows.

As shown in FIG. 1, the support plate 30 is insert-molded in the sun visor body 10 while placing the first engagement hole 31 and the second engagement hole 32 to be concentric with the first insertion hole 11 and the second insertion hole 12, respectively.

Then as shown in FIG. 2 and FIG. 3, the first elastic engagement hook 21 and the second elastic engagement hook 22 are inserted into the first insertion hole 11 and the second insertion hole 12, respectively. During the insertion, the first elastic engagement hook 21 and the second elastic engagement hook 22 are elastically deformed and pass through the first engagement hole 31 and the second engagement hole 32, respectively. When the hooks Cs and the hooks Cw completely pass through the corresponding engagement holes, the first elastic engagement hook 21 and the second elastic engagement hook 22 return to the shape before the elastic deformation, and their hooks Cs and the hooks Cw are engaged with the first engagement hole 31 and the second engagement hole 32.

In this way, the ticket holder 20 can be easily attached to the support plate 30 that is insert-molded in the sun visor body 10.

That is the detailed descriptions on preferred embodiments of the present invention. The sun visor structure 100 of the present invention is not limited to the above-described embodiments, and may be variously modified and changed within the scope of the present invention described in the appended claims.

The sun visor structure 100 of the present invention includes: the sun visor body 10 made of foamed resin; the support plate 30 that is insert-molded in the sun visor body 10; and an attachment component 20 supported by the support plate 30. The attachment component 20 has the first elastic engagement hook 21 and the second elastic engagement hook 22. The sun visor body 10 has the first insertion hole 11 and the second insertion hole 12 for inserting the first elastic engagement hook 21 and the second elastic engagement hook 22, respectively. The support plate 30 has the first engagement hole 31 and the second engagement hole 32 to engage the first elastic engagement hook 21 and the second elastic engagement hook 22, respectively, the first engagement hole 31 and the second engagement hole 32 being smaller than the first insertion hole 11 and the second insertion hole 12 and being concentric with the first insertion hole 11 and the second insertion hole 12, respectively. This configuration provides the sun visor structure 100 capable of supporting the attachment component 20 reliably and having a high degree of freedom for design to place the attachment component 20.

REFERENCE SIGNS LIST 10 sun visor body
100 sun visor structure
11 first insertion hole
12 second insertion hole
20 ticket holder (attachment component)
21 first elastic engagement hook
22 second elastic engagement hook
23 guide pin
24 base
25 elastic tongue
30 support plate
31 first engagement hole
32 second engagement hole
33 positioning hole
34 failsafe hole
35 protrusion
Cs hook
Cw hook
L imaginary neutral line
P cylindrical part
M rotating direction

The invention claimed is:
1. A sun visor structure comprising:
a sun visor body made of foamed resin;
a support plate that is insert-molded in the sun visor body; and
an attachment component supported by the support plate,
wherein the attachment component has a first elastic engagement hook and a second elastic engagement hook,
the sun visor body has insertion holes for inserting the first elastic engagement hook and the second elastic engagement hook,
the support plate has engagement holes to engage the first elastic engagement hook and the second elastic engage- ment hook, the engagement holes being smaller than the insertion holes and being concentric with the insertion holes, the attachment component has a guide pin, and the support plate has a positioning hole for inserting the guide pin to position the attachment component.

2. The sun visor structure according to claim 1, wherein the support plate has a protrusion at a center part, the protrusion protruding toward the attachment component, and the protrusion has the positioning hole.

3. The sun visor structure according to claim 1, wherein the support plate has a failsafe hole at a position displaced from a line connecting centers of the engagement holes.

4. The sun visor structure according to claim 1, wherein the attachment component is a ticket holder including a base having the elastic engagement hooks and an elastic tongue that is cantilevered and extends from the base.

5. The sun visor structure according to claim 4, wherein each of the elastic engagement hooks has a pair of opposed hooks, and the pair of opposed hooks are opposed in an extending direction of the elastic tongue.

6. The sun visor structure according to claim 5, wherein one of the pair of opposed hooks that is close to the elastic tongue has an engagement strength larger than the other hook has.

7. The sun visor structure according to claim 2, wherein the support plate has a failsafe hole at a position displaced from a line connecting centers of the engagement holes.

8. The sun visor structure according to claim 2, wherein the attachment component is a ticket holder including a base having the elastic engagement hooks and an elastic tongue that is cantilevered and extends from the base.

9. The sun visor structure according to claim 3, wherein the attachment component is a ticket holder including a base having the elastic engagement hooks and an elastic tongue that is cantilevered and extends from the base.

* * * * *